UNITED STATES PATENT OFFICE.

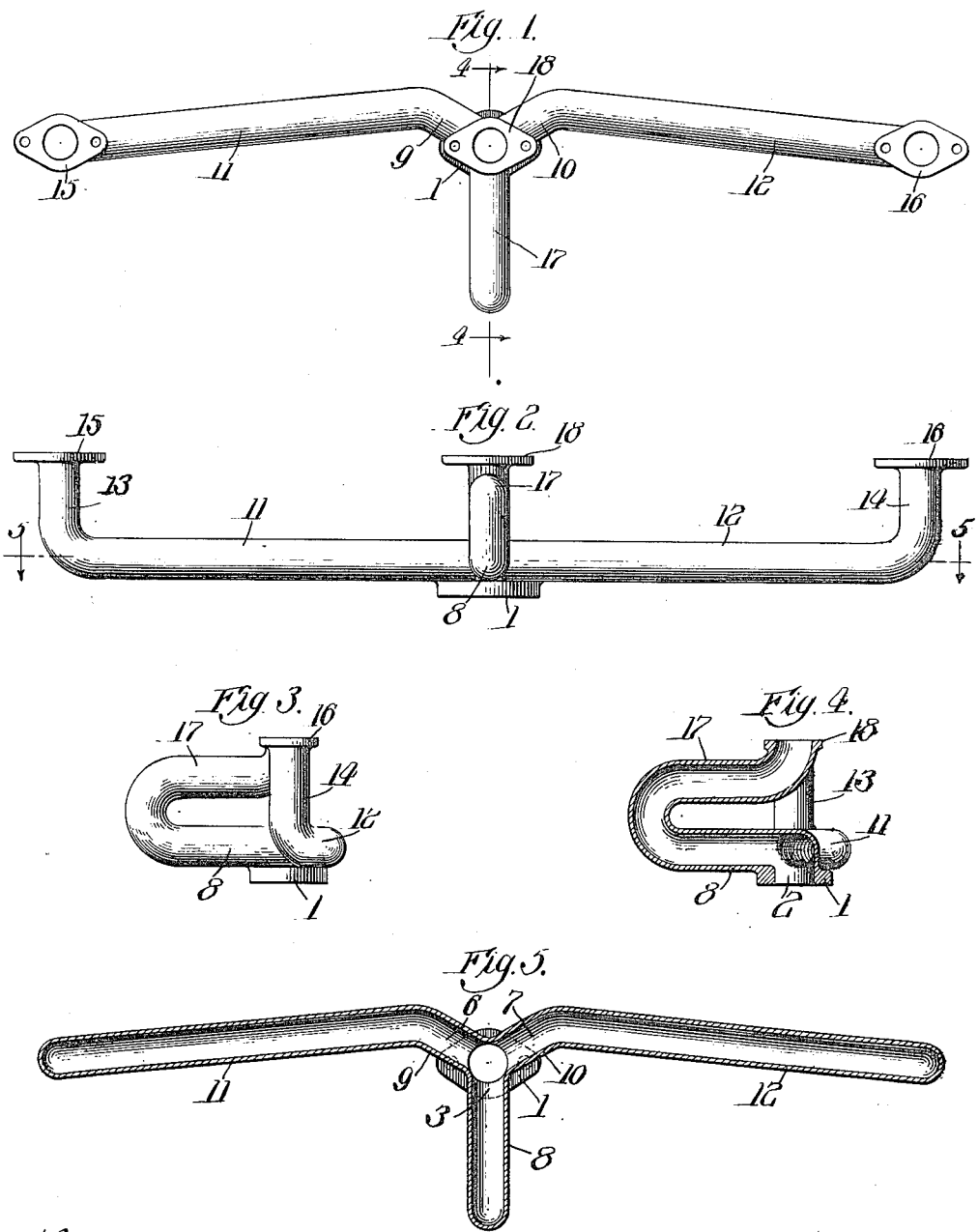

EDWARD R. GREER, OF MINNEAPOLIS, MINNESOTA, ASSIGNOR TO EMERSON-BRANTINGHAM COMPANY, OF ROCKFORD, ILLINOIS, A CORPORATION OF ILLINOIS.

ENGINE-MANIFOLD.

1,150,264.     Specification of Letters Patent.     Patented Aug. 17, 1915.

Application filed October 18, 1912. Serial No. 726,422.

*To all whom it may concern:*

Be it known that I, EDWARD R. GREER, a citizen of the United States, residing at Minneapolis, in the county of Hennepin and the State of Minnesota, have invented certain new and useful Improvements in Engine-Manifolds, of which the following is a specification.

This invention relates to manifolds used in connection with internal-combustion engines, and more particularly to those known as intake-manifolds, used to conduct a flow of gas from the carbureter to the engine.

The object of the invention is to construct a manifold for an internal-combustion engine having three or more cylinders, so that the pipe-sections of the manifold leading to the different cylinders will offer an equal resistance to a flow of gas through said pipe-sections.

In the accompanying drawings: Figure 1 is a plan view of my improved manifold. Fig. 2 is a front view of the manifold. Fig. 3 is an end view of the manifold. Fig. 4 is a vertical section taken on the line 4—4 of Fig. 1. Fig. 5 is a horizontal section taken on the line 5—5 of Fig. 2.

The manifold is shown in the position it is to be connected to an engine; the flange 1, having opening 2, being connected to a suitable connection leading to a carbureter, said opening 2 forming the intake of the manifold. From said intake opening 2, extends horizontally and radially, three passages 3, 6 and 7, formed by the pipe sections 8, 9 and 10, respectively, said sections being spaced equally, that is, 120° apart. The two sections 9 and 10 extend in opposite directions, forming the side-sections 11 and 12, respectively, the ends thereof lying in a line drawn through the center 2, said ends being upturned, forming the vertical-portions 13 and 14, which have flange-portions 15 and 16, respectively, formed at their ends. These flange-portions are adapted to be connected to the cylinders of an engine, thereby forming the passages 9, 11, 13 and 10, 12, 14, from the intake 2, to the cylinders. The pipe section 8 is extended, forming with its upper portion 17, a U-shape construction, and having the end of section 17 formed to a vertical position, with a flange-portion 18 formed therewith, said flange-portion 18 lying above the flange 1 and in a line connecting the center of the flange-portions 15 and 16, thus forming the passages 8, 17, from the intake 2 to the center cylinders.

It will be seen that by the arrangement of the three intake sections, 9, 11, 13; 10, 12, 14, and 8, 17, the gas or mixture enters the one opening 2, coming straight up, is then distributed at 90° from the intake flow, into the three passages 8, 9 and 10, equally spaced, and then passes through a length of pipe, each of which is of the same or substantially the same length and adapted to offer the same resistance to the flow of gas entering its respective cylinders.

The manifold can be connected either to a three-cylinder engine, having each of the flange-portions 15, 16 and 18, connect with one cylinder separately, or in a six-cylinder engine, have each one of said flange-portions connect separately to the intake-chamber of two cylinders. In this latter method, the firing order of the cylinders should be arranged so that the gas intake or explosive-mixture, will not flow twice through the same pipe-section in succession, thereby giving an even distribution of gas to each cylinder.

It will be seen that a manifold embodying my invention can be used on all engines of three or more cylinders, as the principal idea, that of diverting a section of pipe from a direct course to its cylinder, so that all of the pipe-sections will be of the same length, can be easily arranged by a skilled mechanic, to suit the engine.

I claim as my invention:

1. An engine manifold comprising an intake conduit, and three conduits emanating therefrom in a common plane transverse to the intake conduit and being spaced apart 120 degrees, the three conduits terminating at spaced points in a straight line and being formed so that they are of substantially equal lengths.

2. An engine manifold comprising an intake conduit, and three conduits emanating laterally therefrom spaced apart equal distances around the periphery of the intake conduit, the three laterally extending conduits being of substantially equal lengths.

3. An engine manifold comprising an intake conduit, and three conduits emanating therefrom transverse to the intake and being spaced apart 120 degrees, each conduit being diverted from its path leading from the intake conduit and being shaped to terminate at spaced points in a straight line and to be of substantially equal lengths.

4. In an engine manifold, the combination of an intake conduit, and three conduits emanating therefrom transverse to the intake conduit and being spaced apart 120 degrees, two of the conduits being diverted to extend in opposite directions, a third conduit formed U-shaped, and the three conduits terminating at spaced points in a substantially straight line.

In testimony whereof I have hereunto set my hand in presence of two subscribing witnesses.

EDWARD R. GREER.

Witnesses:
MARVIN C. BARNUM,
CARL F. NELSON.